United States Patent [19]

Kain

[11] Patent Number: 5,546,806
[45] Date of Patent: Aug. 20, 1996

[54] MICROWAVE VECTOR DISPLACEMENT AND ACCELERATION TRANSDUCER

[76] Inventor: Aron Z. Kain, 1733 Corning St., Los Angeles, Calif. 90035

[21] Appl. No.: 355,479

[22] Filed: Dec. 14, 1994

Related U.S. Application Data

[60] Division of Ser. No. 40,894, May 24, 1993, which is a continuation-in-part of Ser. No. 778,290, Oct. 17, 1991, Pat. No. 5,261,278.

[51] Int. Cl.⁶ ..................................................... G01P 15/08
[52] U.S. Cl. ..................... 73/514.31; 73/514.16
[58] Field of Search ............................. 73/517 R, 517 B, 73/516 R, 514.16, 514.31, 514.12; 324/635, 636

[56] References Cited

U.S. PATENT DOCUMENTS 3,636,752  1/1972  Ishii ....................................... 73/517 R

OTHER PUBLICATIONS

Blair et al., "Microwave Non–Contacting Accelerometer for Gravity Wave Antenna", IEEE Trans., vol. MAG–13, No. 1, Jan. 1977, pp. 350–353.
Blair, "Superconducting Accelerometer Using Niobium–on–Sapphire RF Resonator", Rev. Sci. Instr. 50(3), pp. 286–291, May 1979.
W. C. Oelfke et al., "Operation of an Ultrasensitive Superconducting Accelerometer," IEEE Trans., vol. MAG–17, No. 1, Jan. 1981, pp. 853–854.

*Primary Examiner*—John E. Chapman
*Attorney, Agent, or Firm*—Gottlieb, Rackman & Reisman, P.C.

[57] ABSTRACT

A microwave resonant cavity comprises a resonator whose normal RF electromagnetic modes are varied by displacement of a probe. Acceleration of the cavity displaces the probe. The acceleration is determined by the variation in preselected discrete modes. The electrical components of the device may be built from planar structures and microwave energy may be generated within the device.

12 Claims, 10 Drawing Sheets

MICROWAVE VECTOR DISPLACEMENT AND ACCELERATION TRANSDUCER

This is a division of application Ser. No. 08/040,894, filed May 24, 1993 which is a continuation-in-part of application Ser. No. 07/778,290, filed Oct. 17, 1991, now U.S. Pat. No. 5,261,278.

BACKGROUND OF THE INVENTION

This invention relates to transducers to produce signals indicative of the displacement or motion of a mechanically deflecting member. In particular, the invention has use (a) as an accelerometer where the deflection of the deflecting member is caused by an acceleration or (b) as a pressure transducer where the deflection of the deflecting member is caused by a response to a pressure change. The invention further relates to microwave resonant structures in which modifications of normal modes of the electromagnetic microwave field is used to detect motion of a component of the apparatus.

It is well known that the perturbation of the electromagnetic fields contained within a resonant structure will produce a corresponding change in the resonant frequency of the structure's electromagnetic normal modes. U.S. Pat. No. 3,636,752 to Ishii, for example, disclosed a microwave acceleration sensor which employed a microwave cavity resonator having a ferrite rod that was stressed in response to the component of an acceleration along the axis of the rod. Because of the nature of the ferrite, the stresses induced changes in the electromagnetic field within the cavity due to changes in the electromagnetic permeability of the ferrite. The device was capable of measuring only one component of its acceleration. Apparently, multiple devices would be necessary to determine the direction of acceleration.

U.S. Pat. No. 3,909,713 to Billeter measured the displacement of a test specimen which functioned as the inner conductor of a coaxial cavity resonator. The test specimen was fixed to a moveable wall of the resonator so that deformation of the specimen varied the dimensions of the resonator cavity. The change in resonant frequency in two different electromagnetic modes were detected, which corresponded to detection of changes in the diameter and axial dimension of the cavity. Vibration transducers have also been fashioned by having one surface of a wave guide cavity undergo the vibration that is to be measured. These devices each required the deformation of the overall dimensions of the cavity in order to function.

The U.S. Pat. No. 3,066,267 to Menhennett is also relevant to prior knowledge of the relationship between the electrical size of a cavity and the frequencies of various electromagnetic modes. The general theory may also be found in standard texts such as Jackson, "Classical Electrodynamics" Ch. 8, pp. 235-67, 1962 Ed.

Acceleration measurement using microwave detection of overall cavity dimension variation has also been reported in attempts to detect gravity waves generated by, for example, supernovas. See, for example, Blair, et al., "Microwave Non-Contacting Accelerometer For Gravity Wave Antenna". IEEE Trans. Vol. Mag-13, No. 1, January 1971. An ultrasensitive superconducting accelerometer has been described where a displacement of a mass along a single axis of motion increases the capacitance in an electromagnetic resonant circuit formed of high Q superconducting resonant cavities. See "Operation Of An Ultrasensitive Superconducting Accelerometer", IEEE Trans. Vol. Mag.-17, No. 1, January, 1981, and "Superconducting Accelerometer Using Niobium-On-Sapphire RF Resonator", Rev. Sci. Instrum. 50(3) pp. 286-91 May, 1979.

The foregoing systems are all characterized as capable of providing displacement and acceleration transducers that are limited either by requiring that the resonant cavity itself is deformed by the displacement or acceleration that is to be measured, or in addition that are limited by in general being capable of measuring only one component of the vector displacement or acceleration of interest.

BRIEF DESCRIPTION OF THE INVENTION

The present invention employs a resonating structure which may be one or more of the following: an electrically hollow cavity; a dielectric resonator which may be within the cavity; a gap between resonating conducting strips possibly enclosing a dielectric material; discrete inductors and capacitors forming a resonating circuit; or inductive elements having a parasitic capacitance. In each of these structures discrete resonant modes of the resonator are excited. These modes may be chosen to provide sufficient information to determine one or several vector components of the displacement of an object located in the cavity, or to determine the magnitude of the displacement without regard to its direction. In some instances, the direction of the displacement may be uniquely determined within an infinite subset of all conceivable directions, although not globally. For example, the direction may be determined uniquely except for the possibility of the mirror image direction in a pre-determined symmetry plane. Although this limits the direction to only one of two possible directions (bi-directionality) for the acceleration out of the original infinity of possible directions, this potential ambiguity may be eliminated by the manner in which the apparatus is employed. Accelerations of interest may be known in advance to occur only forwards, or the device may be used to detect sudden increases as opposed to decreases in pressure. In what follows, the reference to the complete determination of an acceleration vector refers to a determination within such an infinite subset of all possible directions. The configuration of the resonator cavity and the location of the dielectric resonator within the cavity or of any elements forming the resonator are not required to change during operation of the device. Indeed, where the resonator is not the cavity per se, it is not required that the cavity be closed.

If the displacement of the object is caused by the deflection of a bending member under the influence of an acceleration then the resulting change in resonant frequency of the modes is dependent upon the acceleration and the entire acceleration vector may be determined. Alternatively the bending member may have only a single degree of freedom corresponding to the component of acceleration along a single axis. That component may then be determined by the present invention. In the general case, it is the relationship between the deflection of the bending member and the resulting modes' amplitude, phase or resonant frequency that forms the basis for use of the transducer as an accelerometer. In those embodiments where the invention is implemented as a vector accelerometer, i.e. an accelerometer that is capable of determining more than one component of the acceleration vector, the invention eliminates the need for multiple accelerometers to be aligned in mutually orthogonal orientations.

This invention provides in one embodiment a device for monitoring the changes in resonant frequency, amplitude or phase in a microwave resonator in direct response to changes in acceleration (or in changes in deflection) of a deflecting member housed within the overall structure.

In some embodiments, the microwave radiation may be supplied to the device from an outside source. In a preferred embodiment, however, designed to be particularly inexpensive to manufacture the device itself generates the microwave signal from a DC input as well as detecting the various modes.

Various manufacturing technologies may be used to practice the invention. A particularly economical and compact embodiment may be manufactured from microwave technology planar structures or lumped elements made by silicon micromachining techniques including thin film surface techniques, such as etching.

It is an object of the present invention to provide an accelerometer which detects the location, with respect to a microwave field within a cavity, of a bending member substantially smaller in size than the cross section area of the cavity.

It is a further object of the present invention to provide such an accelerometer wherein the dimensions are not varied of the components of the device that determine the normal modes of the microwave field present in the cavity.

It is a still further object of the present invention to provide an accelerometer which detects the modification of the amplitude, phase or frequency of a microwave field within a cavity caused by the deflection of a bending member substantially smaller in size than the cross section area of the cavity.

It is an object of this invention to allow a displacement or acceleration to be directly monitored as a vector quantity as a result of the change in frequency and rate of change in frequency of resonant modes.

It is a further object of this invention to enable one such accelerometer to determine the sensed acceleration in three dimensions, or to characterize the magnitude of the acceleration without regard to its direction as opposed to requiring three orthogonally placed accelerometers to determine the acceleration.

Another object of this invention is to provide an accelerometer that can be manufactured at a fraction of the cost of conventional accelerometers.

It is a further object of the present invention to provide such an accelerometer manufacturable from common microwave technology planar structures permitting mass production at low cost.

It is a still further object of the present invention to provide such an accelerometer manufactured from discrete lumped inductive and capacitive components made by micro-manufacturing techniques such as thin film etching.

BRIEF DESCRIPTION OF THE DRAWINGS

The above mentioned objects of this invention and other features will be more evident by reference to the following description in accordance to the accompanying drawings, in which:

FIG. 1b is a plan view of the major components of the accelerometer with corresponding numerals of reference as in FIG. 1a.

FIG. 2b is a magnitude plot of the change in frequency associated with the mode in FIG. 2a.

FIG. 3a–1 is a contour plot of a different resonant mode associated with the embodiment of FIG 3a–z.

FIG. 3b is a magnitude plot of the change in frequency associated with the mode in FIG. 3a.

FIG. 4b is a magnitude plot of the change in frequency associated with the mode in FIG. 4a.

DETAILED DESCRIPTION OF A PREFERRED EMBODIMENT

Figure 1A:
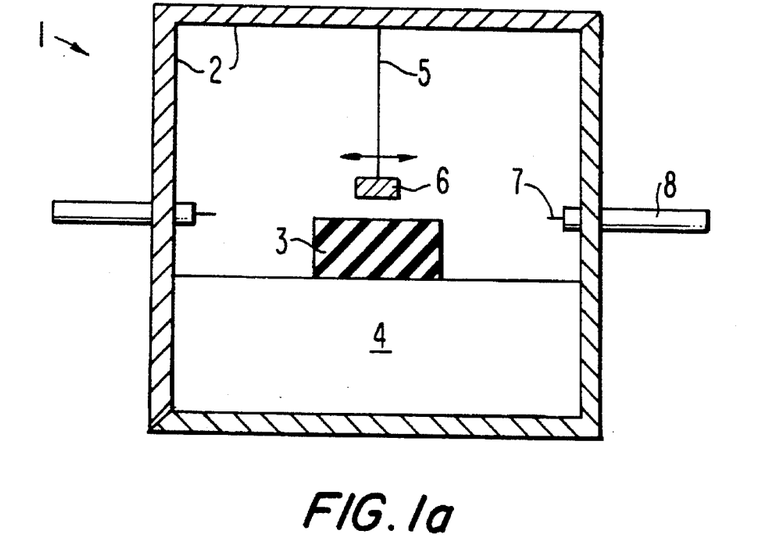
FIG. 1a is a cross-sectional view through the resonant cavity which indicates the major components of the preferred embodiment of the accelerometer design.
Figure 1B:
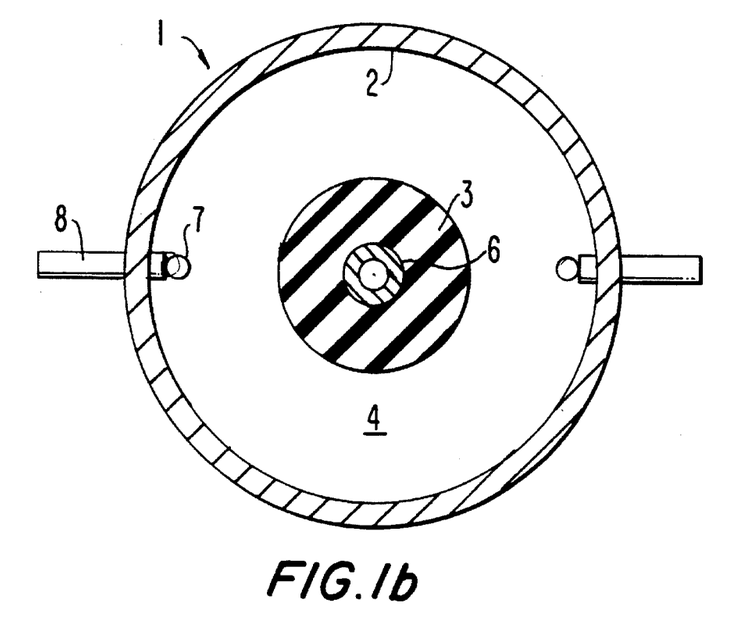

Referring to FIG. 1a and b by numerals of reference, 1 denotes an accelerometer consisting of a metallic cylindrical cavity 2. Contained within 2 is a dielectric resonator, 3, mounted axially on a Teflon dielectric support, 4. Suspended above the dielectric resonator by a thin wire, 5, permanently attached to the cavity, 2, is a metallic block 6. This block is free to move in any direction parallel to the surface of the dielectric resonator, under the influence of an applied acceleration (force or deflection). R.F. energy is coupled in/out of the cavity 2, by way of coaxial cable, 8, terminated in a loop of wire, 1, as is the standard procedure for exciting magnetic fields in an electromagnetic cavity.

The RF energy coupled into the cavity excites certain well known discrete resonant modes associated with the geometry of the dielectric resonator. This will be described further below. The dielectric resonator is 0.505" in diameter and 0.227" in thickness and has a dielectric constant of 37. The Teflon support, 4, measures 1.5" in diameter by 0.65" thick. The overall inner dimension of the copper cavity, 2, is 1.5" diameter by 1.5" long. The 0.141" diameter coax is located at the midpoint of the length of 2, with the coupling loops 0.1" in diameter. The loops are both oriented perpendicular to the axis of rotation of 2 as is indicated in FIG. 1b. The loops are also located as close as possible to the cavity wall, 2.

Suspended 0.015" above the center of dielectric resonator, 3, is a 0.1" diameter stainless steel block 0.1" long. This block, 6, is soldered to a copper wire, 5, 0.008" in diameter by 0.508" long. This wire, 5, is itself soldered to the cavity 2.

Upon application of acceleration (force) the block 6 will cause the wire 5 to deflect according to characteristics of cantilever beams of cylindrical cross-section under the influence of end loads as is well known to persons of ordinary skill in this art. Because the metallic block 6 imposes certain well-defined boundary conditions on electromagnetic fields, the deflection of 6 will cause the resonant frequency of the modes associated with 3 to change in relation to the strength and orientation of the electromagnetic fields located at the position of 6. For example, an electric field oriented parallel to the lower face of block 6 will induce larger resonant frequency shifts than will an electric field oriented perpendicular to the face of the block. It is this direct relationship between the bending of the wire and the induced change in resonant frequency of the modes of 3 that affect the sensing of acceleration. It is to be noted that should one require mechanical damping of the cantilever beam assembly (5 and 6), one can use a constant magnetic field oriented such that it opposes the motion of the block 6. For that purpose, the block 6 is preferably made out of a magnetic material.

Such damping may be advantageous where the motion of the device might tend to over excite the resonant oscillation frequencies of the mechanically oscillating members and introduce distortion in the microwave signal output from the device.

Figure 2A:
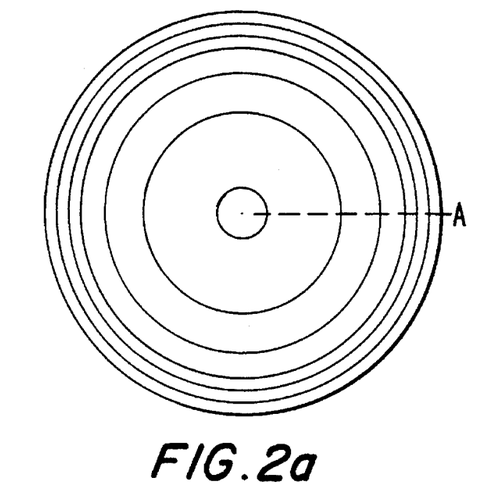
FIG. 2a is a contour plot of one of the resonant modes associated with this accelerometer.
Figure 2B:
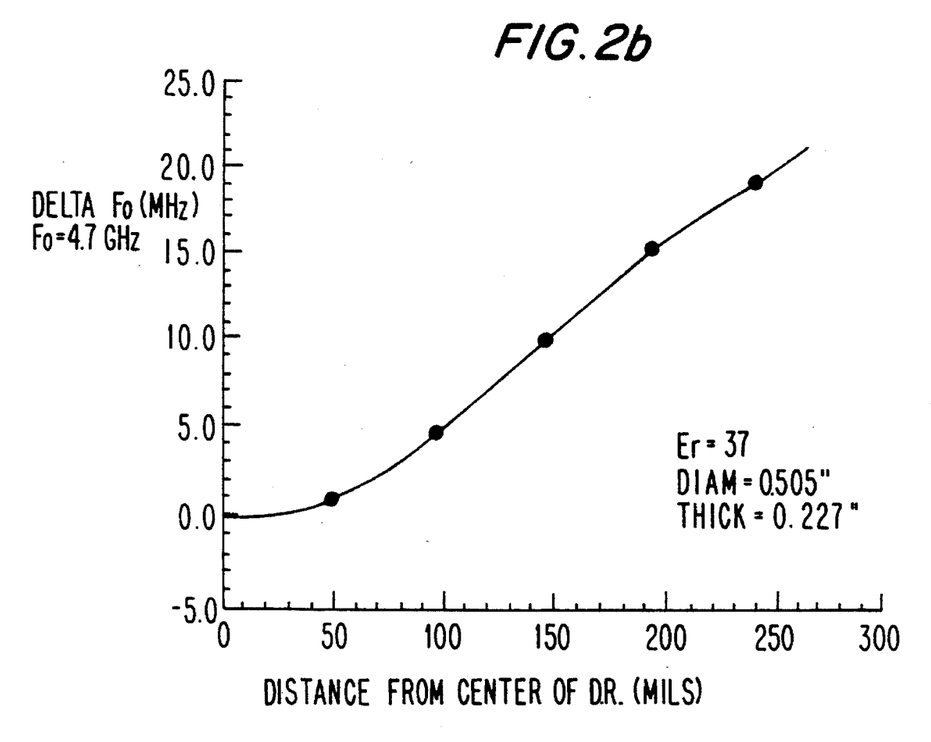

FIG. 2a is a contour plot of the change in resonant frequency of one mode of the dielectric resonator versus the position of block 6 relative to the center of the cavity. FIG. 2b shows the magnitude of this change along the path labeled "A". As depicted, this particular mode is azimuthally independent. Hence the change in frequency versus acceleration, i.e. position along any path will only indicate the magnitude of the acceleration but not the direction.

Thus, this mode will provide a device capable of detecting the magnitude of the acceleration vector without regard to its direction. Although the magnitude of an acceleration vector is a single number, as is each component of the acceleration vector, those two quantities should not be confused. Measuring the magnitude of an acceleration is not the same as measuring one component of the acceleration in a particular direction unless one has additional information that the particular direction happens to be the direction of the acceleration.

Figure 3A:
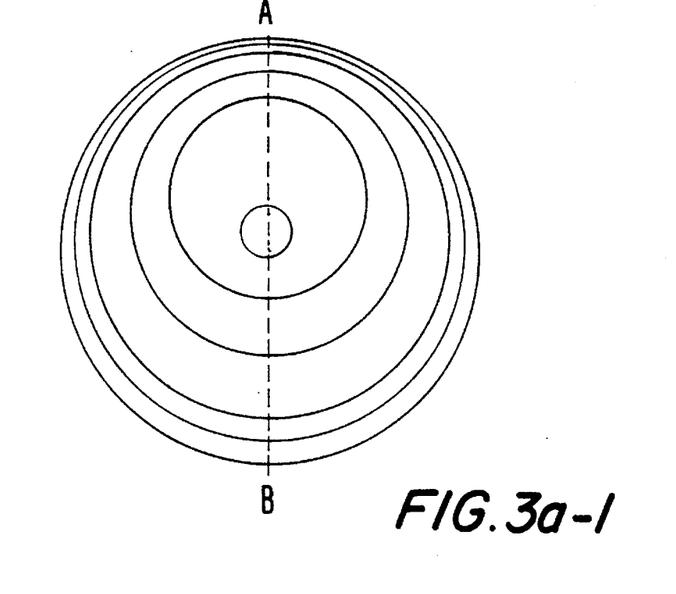
Figure 3B:
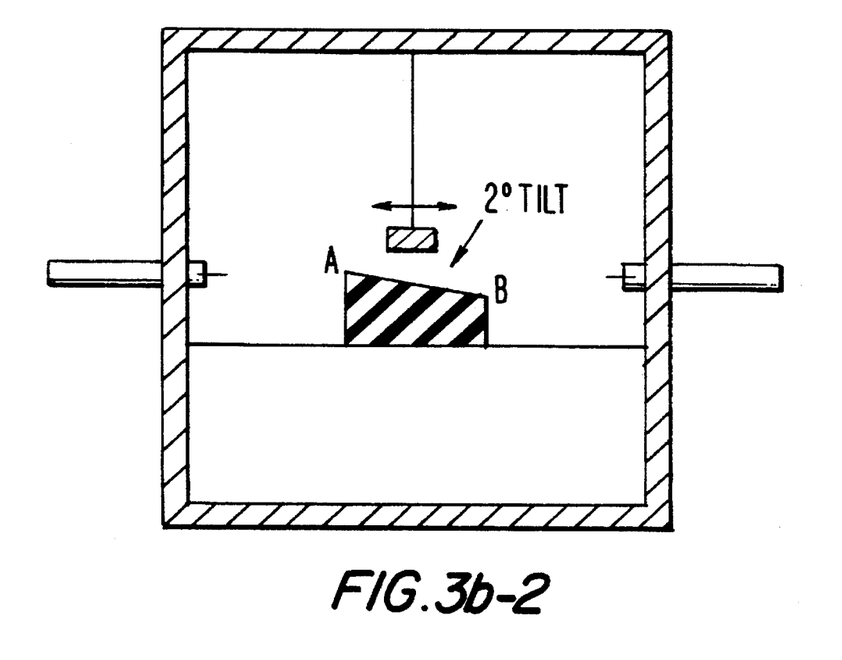
Figure 3B:
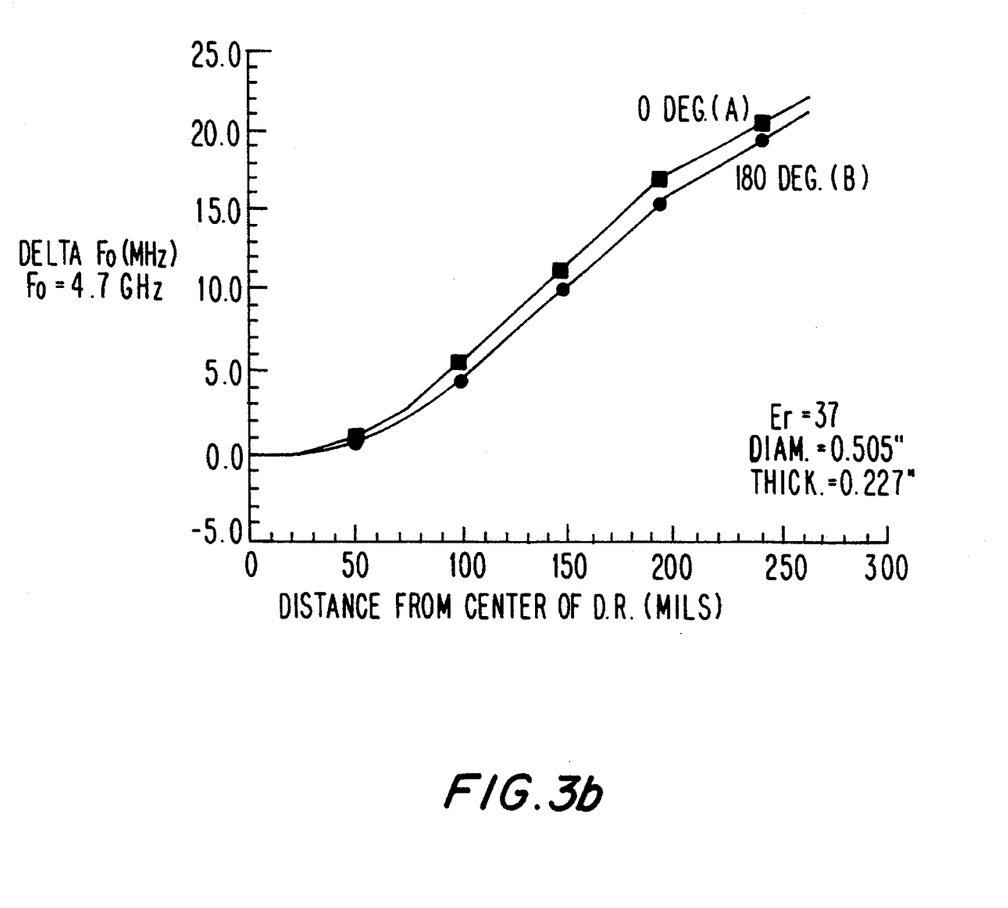

In order to sense the acceleration's direction as well as its magnitude, one has a number of options. FIG. 3a is a contour plot using the same mode as in FIG. 2a, but with the dielectric resonator tilted by 2 degrees relative to the block 6. This tilting of 3 allows the relative separation between 6 and 3 to vary in relation to the angle of tilt. The effect of this tilting is to skew the contours of FIG. 2a off center towards the location of minimum separation between 6 and 3. This is indicated in FIG. 3a-1. Notice path "A", the path along which minimum separation occurs, has a faster spatial rate of change in frequency shift than does path "B". Measuring the difference in the time rate of change in frequency shift of the dielectric resonator's resonance frequency indicates which path is taken. Hence, not only can the magnitude of the acceleration be determined by measuring the absolute magnitude of the frequency shift, but also the direction of the acceleration can be determined by measuring the time rate of change in the frequency shift. This sensing of direction is also indicated in FIG. 3b by the differing slope of the curves.

The displacement of mass caused by the acceleration of the apparatus results in a shift of frequency of a resonant mode of the microwave radiation within the apparatus. Thus by observing the microwave frequency (or the amount of its change) the location of the mass is determined to be on one of the iso-frequency lines. Thus for example, in FIG. 3a-1, points may be on the same iso-frequency curve although they are at different distances from the original (resting) position of the mass. The particular location on an isofrequency line may be determined from the rate of change of the frequency, i.e. the time it takes the mass to reach the extremity of its travel.

The rate of change of frequency due to motion of the mass involves an observation both of the change of frequency and of the time it takes to effect that change. In other words, it is observed how long it takes for the mass to come to reach the end of its travel, i.e. to a position where the frequency is no longer changing significantly. In particular, therefore, this length of time identifies a distance from the initial rest position that the mass has traveled before again coming to rest. From these two observations (change of frequency and the time to effect the rate of change of frequency) the position of the mass and hence the acceleration may be determined as an intersection of the isofrequency curve with a circle (not shown) representing those points that may be reached by the mass in the observed time interval. These two curves will intersect at two points symmetric with respect to the symmetry axis A-B. This determines the direction of the acceleration uniquely if it is known to be located in either half plane.

One can also regard the mass as a harmonic oscillating mechanical system. The system is typically underdamped and therefore executes small oscillations about its final resting place. For an oscillating pendulum the complete motion of the oscillation is well known. All one has to do is replace g with the square root of $g^2+a^2$ in the conventional equations for the motion of a pendulum, where a is the acceleration of the apparatus. Thus, for example, the velocity of the pendulum at the midpoint of its travel and the time to arrive at that midpoint provides information of both the displacement and the velocity of the pendulum at that location. Since the spatial gradient of the iso-frequency lines is simply the time rate of change of the phase divided by the spatial gradient, the spatial gradient is directly determined. Knowledge of the spatial gradient and the phase is another way to characterize the acceleration and its direction as may be seen from FIGS. 3b and 4b. Mechanical systems other than the pendulum would have equally well known mechanics and would present no difficulties to persons of skill in this art.

To explain in greater detail how the time rate of change frequency shift measurement is used, it is sufficient to consider a simple pendulum as the deflecting member. If there is a sudden acceleration "a" in the transverse plane, then the effect on the pendulum is as if it hung under a combined gravitational acceleration of magnitude $g'=(g^2+a^2)^{1/2}$ making an angle $\phi$ with the vertical, where $\tan \phi=a/g$. The pendulum (if undamped) will swing from the vertical through an angle $2\phi$. The period T for such a swinging pendulum is $2\pi(1/g')^{1/2}$, and the time to reach the maximum displacement is half this, $\pi(1/g')^{1/2}$, from which g' and hence a may be determined.

$$a=(\pi^4 l^2 - g^2)^{1/2}/(T/2)^2$$

Thus from a measurement of the time of oscillation of the output from the device, one can determine the acceleration magnitude. To determine the acceleration direction, one can rely upon the modes where the phase and spatial rate of change of phase suffice to determine the location of the deflecting member. The spatial rate of change may be determined from the time rate of change and the velocity of the deflecting member.

$$\frac{d\phi}{dt} = v \frac{d\phi}{dx} \text{ where}$$

$$\frac{d\phi}{dt}$$

is the time rate of change and $$\frac{d\phi}{dx}$$

is the spatial rate of change. Hence, in addition to measuring the phase change it suffices to know v at some point. Taking the case of the pendulum, the greatest value of v is detected at T/4 and 3T/4 of its oscillation. For a pendulum this velocity is known:

$$v=(2l(g'-g))^{1/2}$$

where
as before $$g'=(g^2+a^2)^{1/2}.$$

Thus, $$\frac{d\phi}{dx} = \frac{d\phi}{dt} (2l((g^2+a^2)^{1/2} - g))^{-1/2}.$$

Figure 4A:
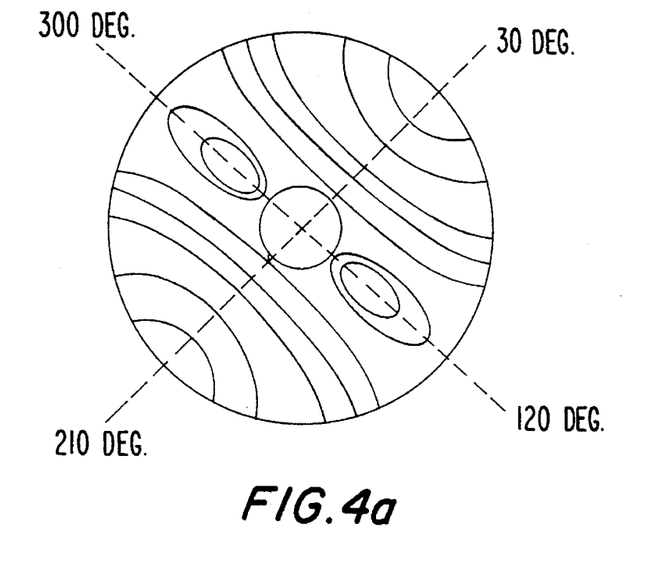
FIG. 4a is a contour plot of yet another different resonant mode associated with this accelerometer.
Figure 4B:
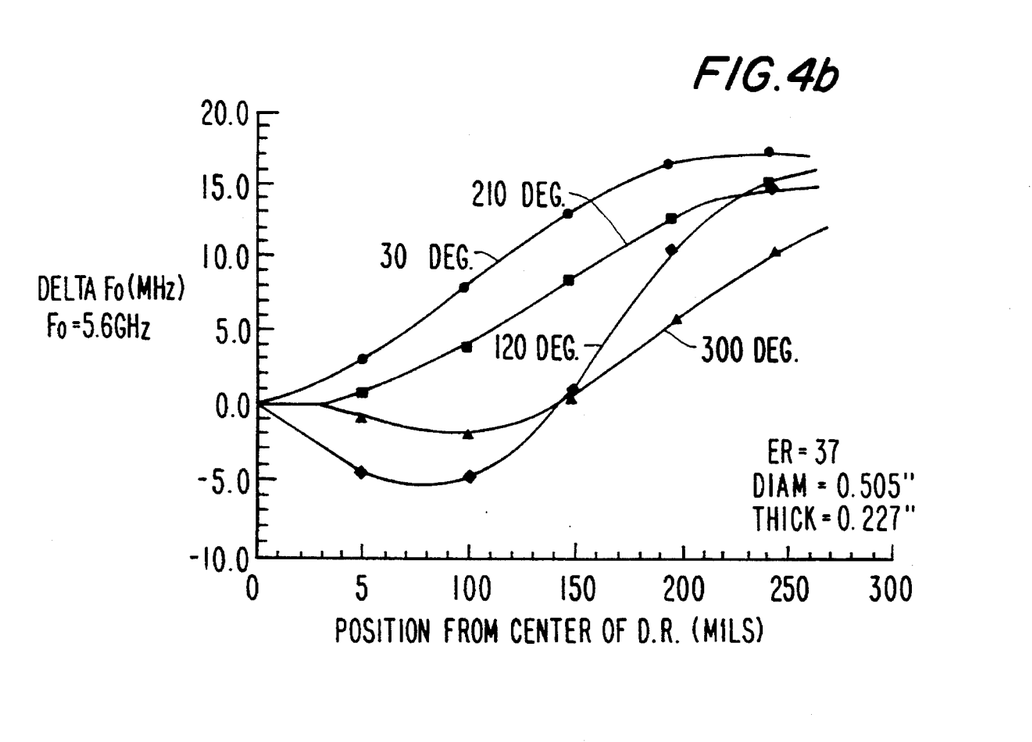

One can also sense the acceleration's magnitude and direction by simply looking at an altogether different resonant mode without resorting to tilting the actual dielectric resonator. FIG. 4a and 4b show an azimuthally dependent mode whereby the absolute frequency change versus applied acceleration (i.e. deflection of 6) is dependent on direction. Once again, measuring absolute frequency shift and time rate of change in frequency shift will indicate both magnitude and direction of the applied acceleration.

If one wanted to measure acceleration in three dimensions, one could simply replace the wire 5 with a coiled spring. The spring would allow free movement of the block 6 in the axial direction, as well as radially and azimuthally. Then the same principles and resonant modes could be used, as outlined above, to sense the acceleration as a true vector in three dimensions.

The same apparatus will measure displacements of the mass which may be caused other than by accelerations of the overall apparatus. For example, the displacement may be caused by contact with a rod connecting to a membrane that is deflected by changes in pressure of a medium in which case the device may function as a pressure transducer. The dynamics of the deflection of the membrane is well known to persons of skill in the art. The fact that the entire displacement vector (or at least more than one component) may be determined allows the invention to correct for any deviation of the direction of the displacement of the membrane from the direction perpendicular to the membrane surface. In effect, the apparatus is a stress transducer that is capable of determining pressure to high accuracy from the components of the stress.

Figure 5:
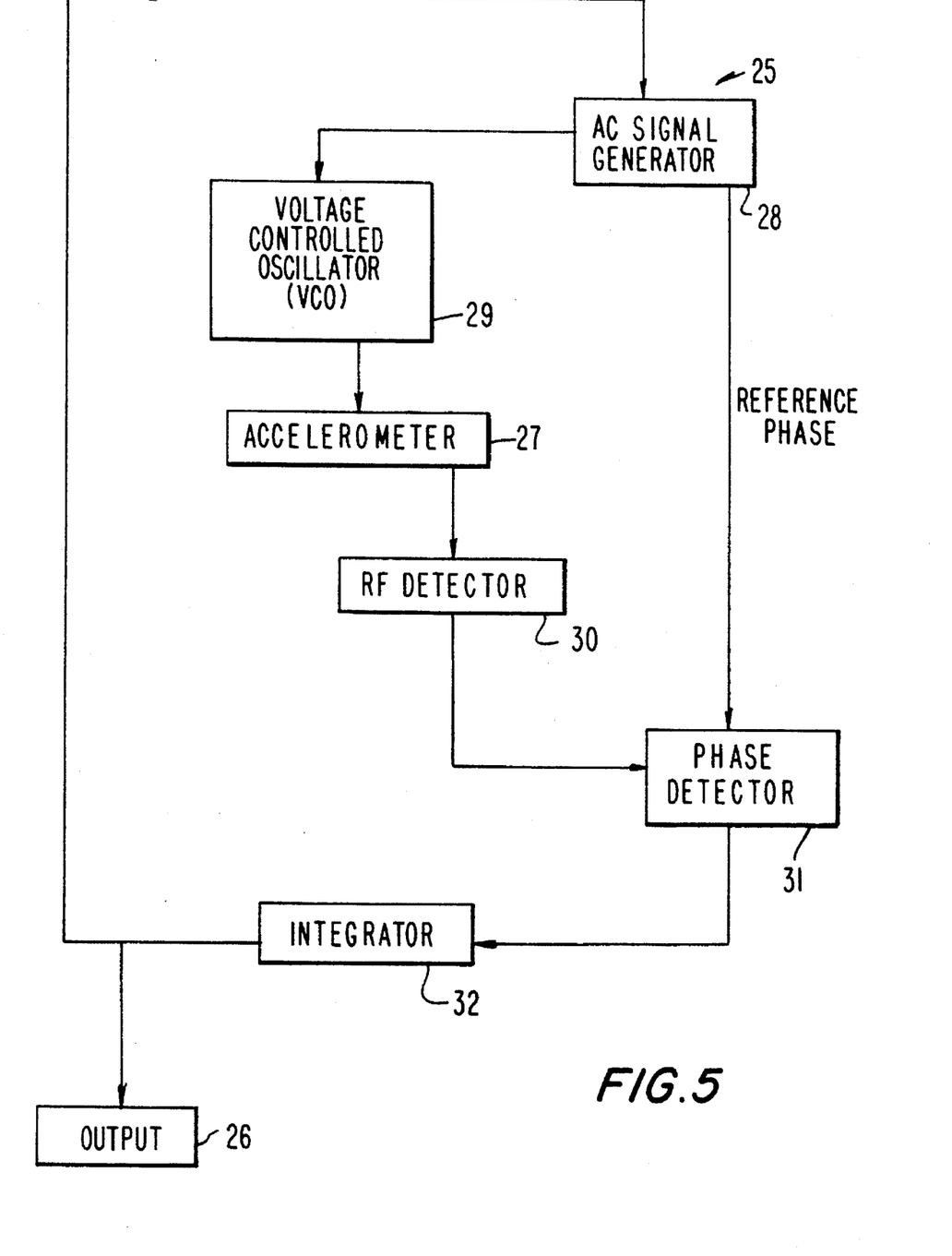
FIG. 5 is a block diagram of a stand alone system incorporating the use of this invention.

As shown in FIG. 5, the present invention may be implemented by having a phase detector 31 which receives input from both an AC signal generator 28 that provides a reference phase and an RF detector 30. The RF detector in turn receives the output of the accelerometer of the present invention, driven by a voltage controlled oscillator 29. The phase detector signal is accumulated by the integrator 32 and passed to the output 26, and recursively supplied to the input device.

Figure 10:
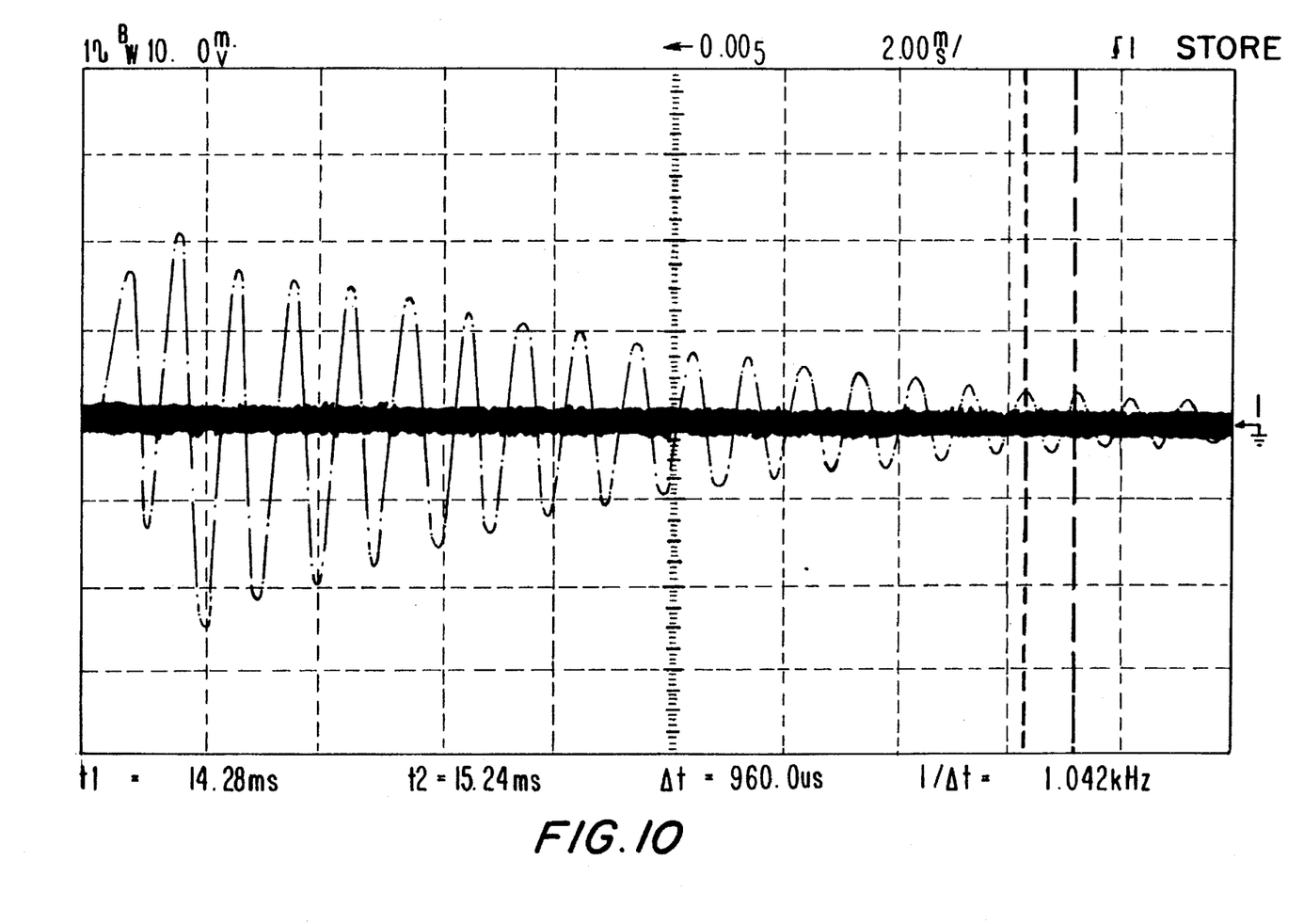
FIG. 10 is a graph of output data from the planar structured embodiment of the present invention.
Figure 11:
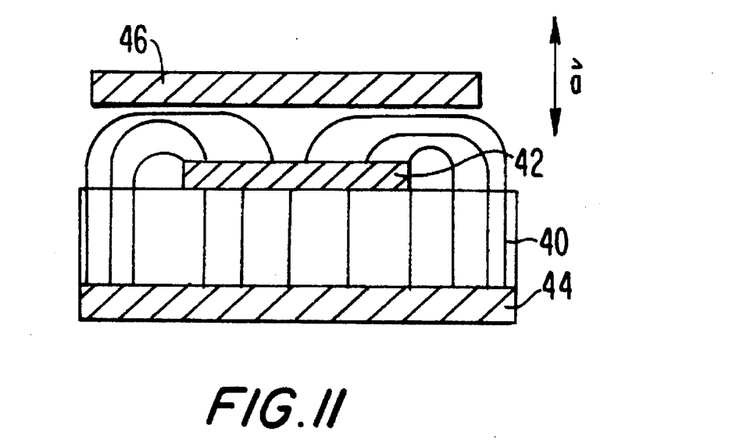
FIG. 11 is a simplified schematic cross section of the planar structure, detector and ground plate of the invention.

As a further preferred embodiment of the present microwave accelerometer a planar structured embodiment will now be described in detail. It is depicted generally in FIG. 6 and FIG. 7. A still further embodiment, a silicon micromachining embodiment, is depicted in FIG. 8. Measurements made on the planar structured embodiment are shown in FIG. 10 and FIG. 11.

Figure 6:
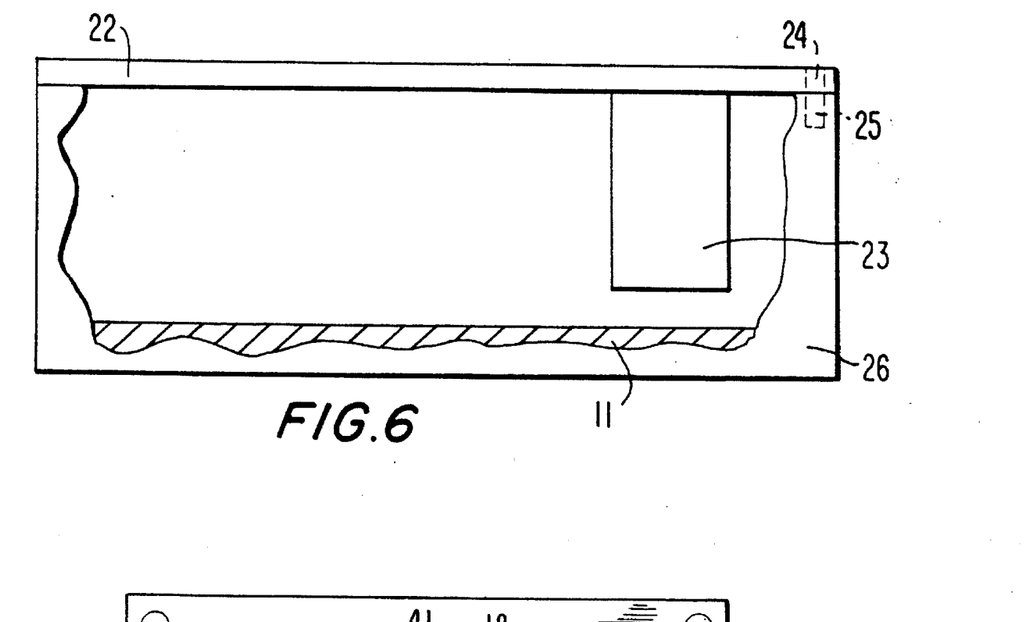
FIG. 6 is a cross section partly cut away view of the accelerometer of the planar structured embodiment of the present invention.
Figure 7:
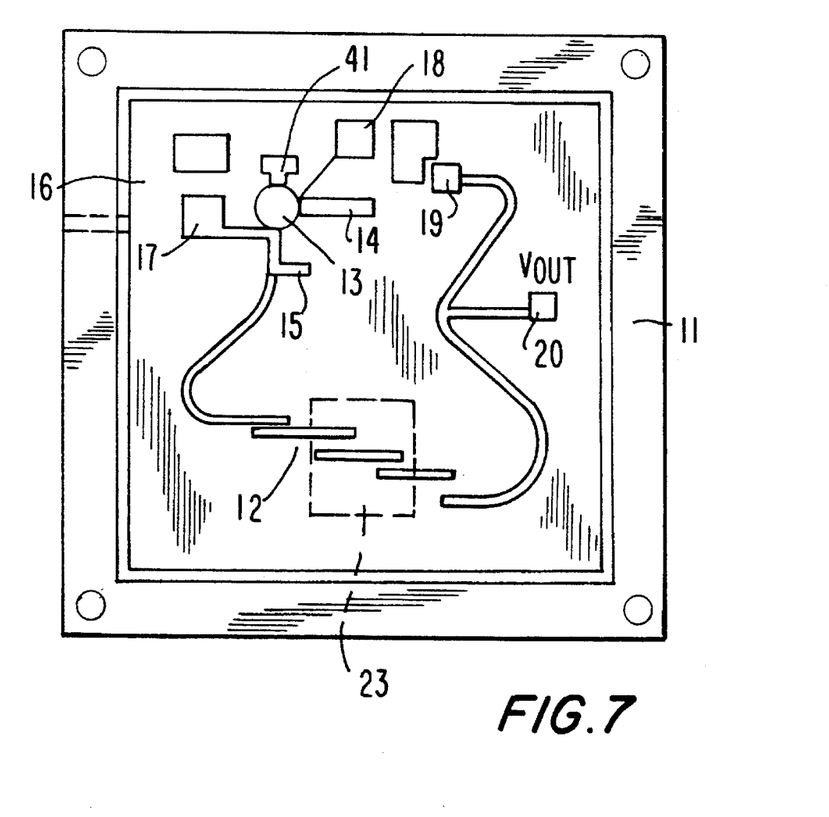
FIG. 7 is a top view of the accelerometer of the planar structured embodiment of the present invention.
Figure 8:
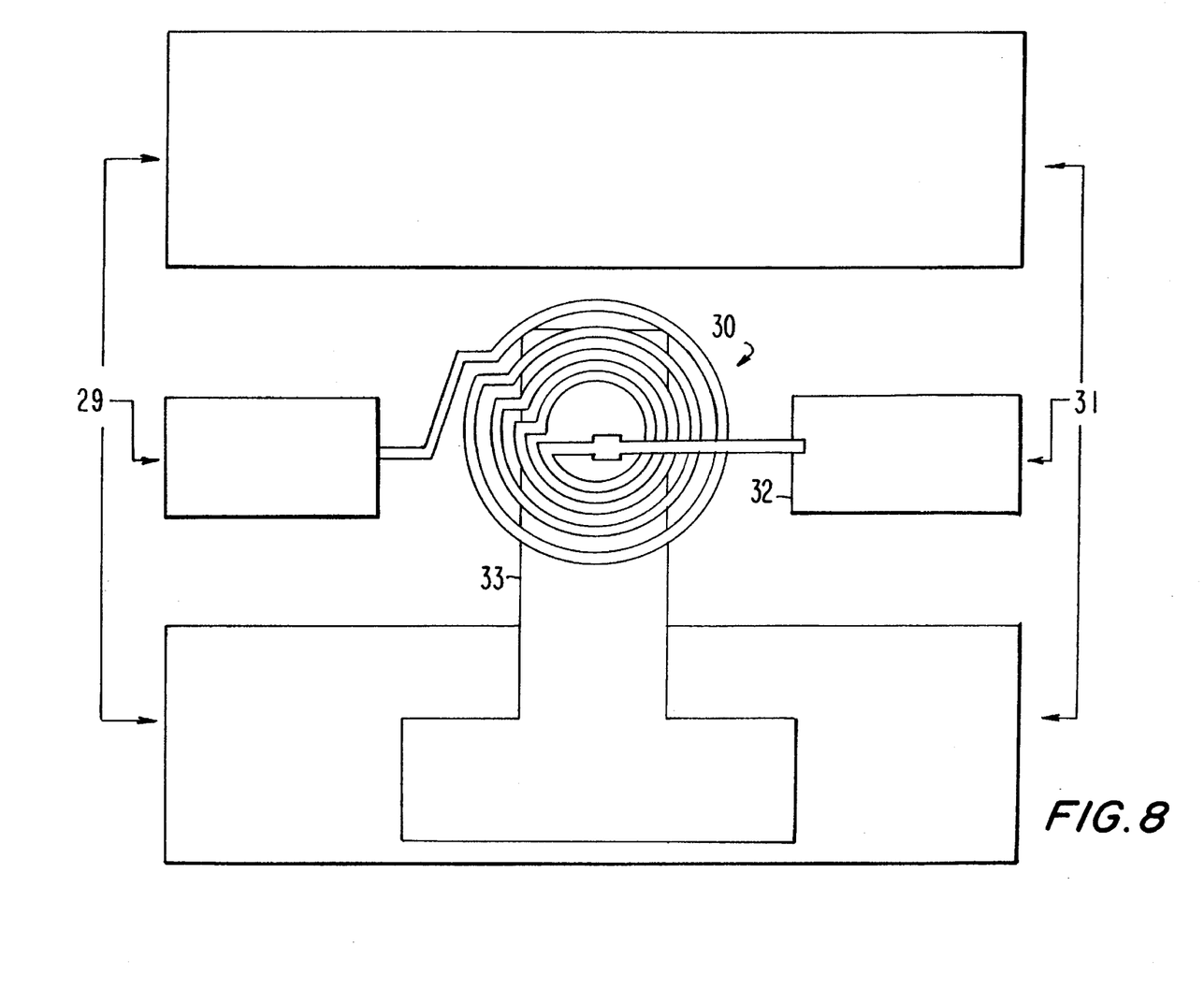
FIG. 8 is a top view of an alternate planar structured embodiment of the present invention.

Referring to FIGS. 6 and 7, a Duroid substrate 11, having dimensions of 1"×1"×0.025" supports all the electrical circuitry required for the accelerometer. The device generates the required microwave signals from a DC input. The device comprises a sensing element and a mechanically deflecting element. The deflecting element is separate from the sensing element.

The Chebychev filter 12, forms the heart of the sensing element. The Chebychev filter is an arrangement of ½ wavelength resonators coupled capacitivity to one other in a manner to achieve certain bandwidth and insertion loss characteristics. To construct such a filter, the desired inductance and capacitance of the microwave generating circuit is first determined as a prototype lumped element model. Persons of ordinary skill in the art of microwave technology will be familiar with the construction of a Chebychev filter from a prototype lumped element model through well known design procedures. Such a procedure is outlined at length in "Parallel-Coupled Transmission-Line-Resonator Filters", S. Y. Cohn, IRE Transactions on Microwave Theory and Techniques, April 1958 pp. 223–231.

Figure 9:
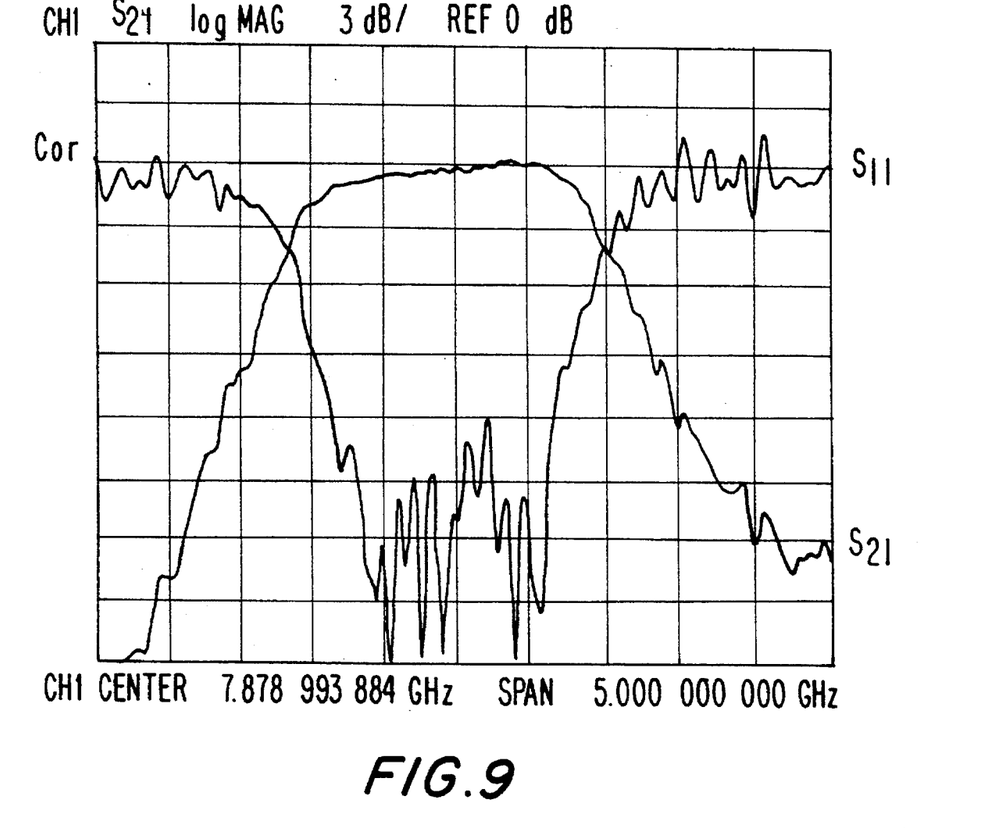
FIG. 9 is a graph of the microwave transmission and reflection characteristics of the filter used in the embodiment of FIG. 7.

A measurement of both S21 and S11, the reflection and transmission coefficients of the filter response, is given in FIG. 9. The bandwidth of the filter seen as the level portion of the transmission coefficient, S21, was chosen to be 1 GHz so that any frequency drift of the microwave source will not affect the devices overall performance.

The device incorporates its own microwave oscillator which comprises a GaAs FET, 13, soldered to a ½ wavelength resonator 14. The FET is used in a common gate configuration so that when combined with resonator 14 the FET oscillates and provides output power of +10 Dbm (i.e. 10 milliwatts) at a frequency of 8 GHz. The output impedance of the oscillator circuit is tuned using a stub 15, so that it matches the impedance of a 50 Ω transmission line leading to the chebychev filter 12. The chip capacitor 16, and the RF chokes, 17, 18 are used for proper dc biasing of the FET at 5V. The gate lead of the FET 13, is grounded 41, to provide an inductive feedback element thereby enhancing the ability of the FET 13, to oscillate.

The output of the oscillator just described comprising elements 13, 14, 15, 16, 17, 18 and 41 is then fed into the filter 12, where the acceleration is sensed. The output of the filter 12 is then fed into a detector diode 19, which converts the RF power from the filter into a DC voltage available at Vout of the rf choke 20. The entire electrical circuit in this preferred embodiment is self-contained and only requires single leads for each of 5 V bias, ground and Vout terminals. All RF is generated, sensed, and terminated on substrate 11.

The copper traces forming the elements on the duroid substrate 11 are preferably 0.021" wide yielding a characteristic impedance of 50 Ω. The filter 12 has air gap widths between its elements, proceeding from left to right in FIG. 7 of 4.5, 14, 14, 4.5 mils for the four gaps. The three resonator lengths are each 0.135" long which yields a filter center frequency of approximately 8 GHz. The surface mounted diode 19 is used in an unbiased detection scheme due to the relative high power output of the oscillator, thereby reducing the cost of the components by eliminating the need for zero bias diodes.

The components used in this prototype are:
1. a single GaAs FET (Avantek ATF26884)
2. a single surface mount diode (HP HSMS81001)
3. a single 2200 Pf capacitor
4. a single 1"×1"×0.025" Duroid (™) (fiberglass filled Teflon) substrate (6010.5)
5. a single block of microwave absorbing material 0.25" on a side (ECOSORB-175)
6. a single BeCu spring plate FIG. 6 shows the overall system layout in a side cut away view. The mechanical deflecting piece comprising the beryllium copper deflecting plate 22, and 0.250"×0.250"×0.230" ecosorb block 23, is attached to the box 26, by an adhesive (epotek epoxy) and by screws fitting into 25 at each box corner. The ecosorb block 23 rests 0.020" above the Chebychev filter 12 such that its projection is centered on the filter. FIG. 6 shows the substrate 11 soldered in place inside an electrically conductive box 26. Mounting holes are provided 25, so that the deflecting plate 22 can be mechanically connected to the box 26.

As the entire apparatus undergoes acceleration the plate 22 will deflect and oscillate according to well known mechanical laws. This in turn will cause the block 23 to approach/recede from the filter 12. Based on how close or far the block 23 is above the filter 12, the filter's resonator section electrical field lines will attenuate inside the block 23 thereby attenuating the overall signal that is detected by the diode 19. As a result, Vout of the diode 19 varies with the acceleration of the device.

FIG. 10 is an impulse response for the preferred embodiment to an acceleration of 10 g. The maximum displacement of the bending member occurs at 14.28 ms after the impulse. The amplitude of the oscillation may be read from the graph. Once the device is constructed, a table of accelerations verses times to reach peak amplitude may be constructed and used to read accelerations from the output signal. Such a table is shown below:

Table of acceleration vs. output voltage from chebychev embodiment

| Acceleration | Vout |
|---|---|
| 10 g | 20 mV |
| 20 g | 40 mV |
| 30 g | 60 mV |
| 100 g | 190 mv |

In the essentially undamped state, Vout 20 is clearly seen to decay with a natural frequency of the device of 1.042 kHZ.

Certain alternative embodiments are anticipated by this disclosure. A damping fluid such as silicone oil can be used to fill the cavity of 26 so that the plate 22 can be critically damped. In addition, the plate can be made out of a magnetic material such as stainless steel. This would allow an electromagnet to be placed above the plate 22 outside of the box 26. When the electromagnet is turned on the stainless steel plate will deflect based on magnetically induced forces. This deflection can then mimic a pre-determined acceleration thereby allowing the device to be self testing. This is important for some applications such as car air bag actuators.

An advantage of the present invention is that it may be further miniaturized using silicon micromachining techniques including the well known art of epitaxial layer formation and micro-etching. As mentioned before, the heart of the accelerometer is a resonator (or combination of resonators). The resonator can be made either using distributed elements such as ½ wavelength coupled transmission lines or lumped elements as in individual inductors and capacitors. The dimensions of the individual inductors and capacitors can be made small enough to work at microwave frequencies. To this end, it is desirable to have the FET, diode and resonators (the individual inductors and capacitors) all on a single chip such that the dimensions of the individual components are much smaller (e.g. less than 1/10 wavelength) than the characteristic operating wavelength. The deflecting member is then monolithically constructed from a polysilicon material using standard silicon micromachining techniques and arranged to deflect above the inductor. As the polysilicon beam deflects, it affects the inductance of the magnetic circuit comprising the inductor thereby changing either the resonant frequency or the amplitude of the resonant frequency, which in turn is detected as the acceleration. Such a device is illustrated in a top view of an alternative embodiment in FIG. 8.

Referring to FIG. 8, the coplanar wave guide structure, 29 has rf input power applied to a resonant spiral coil 30. The resonant frequency of the coil is determined by the coil's inductance and its parasitic capacitance. The input rf enters the coil through the wave guide 29 and exits the device through 31 so that the rf continues to the same detector of the previous preferred embodiment. The crossover wiring 32 provides contact between the coil and the center conductor of the coplanar wave guide 31. The crossover 32 is separated from the lower level coil 30 by a thin film of suitable dielectric material. Deposited above the coil 30 is a polysilicon cantilever beam 33 which serves as a movable ground plane. The ground connection is made between the end of the beam 34 and the ground of the coplanar wave guide 29, 31. As acceleration occurs the beam 33 deflects thereby bringing the electrical ground closer to the coil. This in turn affects the inductance and capacitance of the coil and affects the resonant frequency. If the beam 33 is not grounded to 34 and is just used as a lossy material (similar to the ecosorb in the preferred embodiment) then the amplitude of the resonant frequency signal will be affected.

Returning to the Chebychev filter embodiment, in operation the circuit senses the change in amplitude of a microwave signal passing through an accelerometer. The deflecting member of a preferred embodiment is a beryllium copper (BeCu) spring plate to which the ecosorb is attached. This plate has dimensions of 1"×1"×0.020" so that its natural mechanical resonant frequency is about 1 KHz.

In operation as substantially depicted in FIG. 11, the oscillating member 46 vibrates above a region of dielectric material 40 (duroid) sandwiched between a microstrip element 42 and a ground plate 44. The region between monostrip 42 and ground plate 44 acts as a microwave resonator. The microwave field in that region is affected by the distance of the member 46 from the microstrip 42. It may be thought, for example, that the field above the microstrip 42 is compressed as the metal plate 46 approaches. This is the basic mechanism for causing a variation in microwave amplitude, phase and/or frequency in response to accelerations of the apparatus.

One of the advantages of the design of this apparatus is that the mechanical vibrating elements may be manufactured separate from the microwave generating and sensing components. This not only simplifies manufacture, but permits replacement of the less costly mechanical component, which is more prone to fatigue damage. Other advantages are the monolithic structure of the sensor, where a microwave source and detector are all on a single chip/substrate allowing great miniaturization possibilities.

The present invention is not limited by the details of the described preferred embodiment, but encompasses other uses and properties as defined by the following claims.

I claim:

1. A microwave accelerometer comprising a housing supporting a deflecting element and a sensing circuit, said housing having a ground plate upon which is located a dielectric material, said sensing circuit comprising planar conducting structures contacting said dielectric material, wherein microwave resonating structures are formed by the combination of said planar conducting structures, dielectric material and ground plate, means for generating microwaves in said microwave resonating structures, said deflecting element adapted to oscillate near said planar conducting structures in response to accelerations of the accelerometer structures, wherein fields in said microwave resonating structures are caused to vary in amplitude, frequency or phase.

2. The microwave accelerometer of claim 1 wherein said deflecting element comprises a metal or dielectric plate.

3. The microwave accelerometer of claim 1 wherein said deflecting element comprises a lossy microwave absorbing material.

4. The microwave accelerometer of claim 1 wherein microwaves are generated on said sensing circuit by an oscillator.

5. The microwave accelerometer of claim 1, wherein said deflecting element is removably connected to said housing.

6. The microwave accelerometer of claim 1, comprising means to damp the oscillation of said deflecting element.

7. The microwave accelerometer of claim 1, wherein said planar conducting structure comprises a coil having an inductance and parasitic capacitance to form a resonator in the microwave frequency range.

8. A microwave accelerometer comprising a housing supporting a deflecting element and a sensing circuit, means for generating microwave radiation in said sensing circuit, said housing having a ground plate upon which is located a dielectric material, said sensing circuit comprising inductive and capacitive structures said deflecting element having approximately the size of one of said inductive and capacitive structures and adapted to oscillate near said one structure in response to accelerations of the accelerometer, wherein the amplitude, phase or frequency of microwave radiation present in said sensing circuit is caused to vary.

9. The microwave accelerometer of claim 8, wherein said deflecting element is removably connected to said housing.

10. The microwave accelerometer of claim 8, comprising means to damp the oscillation of said deflecting element.

11. The microwave accelerometer of claim 8 wherein said deflecting element comprises a metal or dielectric plate.

12. The microwave accelerometer of claim 8 wherein said deflecting element comprises a lossy microwave absorbing material.

* * * * *